United States Patent [19]
Nesbitt

[11] Patent Number: 5,998,506
[45] Date of Patent: Dec. 7, 1999

[54] ONE-PIECE GOLF BALL

[75] Inventor: Robert Dennis Nesbitt, Westfield, Mass.

[73] Assignee: Spalding Sports Worldwide, Inc.

[21] Appl. No.: 08/928,775

[22] Filed: Sep. 12, 1997

Related U.S. Application Data

[63] Continuation-in-part of application No. 08/543,136, Oct. 13, 1995, abandoned.

[51] Int. Cl.$^6$ ........................... A63B 37/00; C08F 291/02
[52] U.S. Cl. ............................. 523/219; 524/34; 524/35; 524/406; 524/408; 524/413; 524/420; 524/426; 524/435; 524/437; 524/445; 524/448; 524/449; 524/451; 525/181; 525/193; 525/263; 525/274; 525/301; 473/371; 473/372
[58] Field of Search ...................................... 525/274, 301, 525/191, 193, 263; 473/372, 371; 523/219; 524/34, 35, 406, 408, 413, 420, 426, 435, 437, 445, 448, 449, 451

[56] References Cited

U.S. PATENT DOCUMENTS 3,671,477   6/1972   Nesbitt .

FOREIGN PATENT DOCUMENTS 094434   5/1985   Japan .

*Primary Examiner*—David Buttner

[57] ABSTRACT

The invention provides novel compositions and golf balls formed from those compositions. The compositions generally include a cured blend of an elastomer, a peroxide polymerization agent, a co-agent, and an unsaturated polycarboxylic acid. More particularly, the cured composition includes a cured blend of cis 1,4 polybutadiene, dicumyl peroxide, zinc diacrylate, and fumaric acid. One piece golf balls formed of these compositions have improved durability.

30 Claims, No Drawings

ONE-PIECE GOLF BALL

This application is a continuation-in-part of pending parent application Ser. No. 08/543,136 filed Oct. 13, 1995 now abandoned.

FIELD OF THE INVENTION

This invention relates to a novel composition of matter and to a golf ball made therefrom.

BACKGROUND OF THE INVENTION

Prior art golf balls comprise, in general, three types. The first type is the three piece wound ball wherein a vulcanized rubber string is wound under tension around a solid or semi-solid core, and thereafter enclosed in a sheath or covering of tough, protective material. A second prior art golf ball is a one-piece ball formed from a solid mass of moldable resilient material which has been cured to develop the necessary degree of hardness to provide utility. One-piece molded balls do not have an enclosing cover. A third prior art ball is the two-piece ball that includes a solid core and a cover thereon.

The one-piece ball is formed from a combination of materials such as elastomers, fillers and curing agents which are molded under high pressure and temperature to provide a ball of suitable hardness and resilience. One-piece balls are described, for example, in U.S. Pat. No. 3,313,545, U.S. Pat. No. 3,373,123 and U.S. Pat. No. 3,384,612.

While the wound ball has for many years satisfied both the standards of the U.S.G.A. and most golfers, it has several disadvantages. For example, a wound ball is difficult to manufacture due to the number of production steps required and the careful control which must be exercised in each stage of manufacture to achieve suitable roundness, velocity or rebound, "click" and the like. "Click" is the term applied to the sound produced by the ball when dropped on a hard surface or when struck with a golf club. In addition, the cover material for the wound ball has not provided the optimum in adhesion to the wound core and is susceptible to cutting when struck by a golf club.

One-piece and two-piece golf balls, in contrast to wound golf balls, can be produced with an essentially perfect center of gravity and thus, exhibit excellent aerodynamic properties, superior roll and trueness of flight. Such golf balls are highly resistant to cutting and are practically indestructible during use in normal play. These balls return to round even when severely distorted and maintain their superior flight characteristics after extended use. Further, one and two-piece unitary golf balls can be manufactured with better quality than conventional wound balls. One-piece balls also maintain their playing characteristics throughout wide temperature ranges, possess an excellent shelf life, and do not water log. Moreover, if paint on one-piece golf balls becomes worn or damaged, the one-piece balls may be reclaimed by removing or stripping off the old paint and repainting. In contrast, wound balls seldom last long enough to allow repainting.

Although one-piece balls have several distinct advantages, they have not had satisfactory durability due to brittleness. Most one-piece balls do not survive more than about 1000 hits. A need therefore exists for one-piece balls which have high hardness but yet possess improved durability and flexibility to minimize cracking.

SUMMARY OF THE INVENTION

In accordance with the invention, a novel, cured composition and golf balls of improved durability are provided. The composition includes an elastomer, a polymerization agent, a co-agent for the polymerization agent, and an unsaturated polycarboxylic acid. The elastomer preferably is cis 1,4-polybutadiene, the unsaturated polycarboxylic acid preferably is fumaric acid, the polymerization agent preferably is dicumyl peroxide, and the coagent preferably is zinc diacrylate ("ZDA"). The compositions of the invention further may include a filler material. The compositions of the invention advantageously avoid zinc oxide that is employed in prior art compositions. Golf balls such as one-piece golf balls formed from the compositions of the invention have high flexibility and high durability.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE PREFERRED EMBODIMENT

The invention provides a novel, cured composition, as well as a golf ball formed of that composition. The composition includes an elastomer, a polymerization agent and a co-agent for cross-linking the elastomer, and an unsaturated polycarboxylic acid. Preferably, the compositions employed are free of alkaline oxides and alkaline earth oxides such as ZnO, MgO, CaO and the like. However, the above compositions which are substantially free of these alkaline oxides and alkaline earth oxides, i.e., compositions which have up to about 0.5 parts of alkaline oxides and alkaline earth oxides per about 100 parts elastomer, also may be employed.

Elastomers which may be used in the compositions of the invention include olefins which can be crosslinked by peroxide polymerization agents. Preferably, the elastomer is cis 1,4 polybutadiene because of its very high resiliency and low hysteresis. The molecular weight of the cis 1,4 polybutadiene is from about 50,000 weight average to about 500,000 weight average, preferably about 100,000 weight average to about 500,000 weight average. Other elastomers which may be used include, for example, polyethylene, polypropylene, polybutene-1, polyhexene-1, polyisoprene, ethylene/propylene/non-conjugated diolefin terpolymers, styrene/butadiene rubbers, natural rubber, ethylene propylene copolymers, ethylene propylene rubber, synthetic natural rubber and mixtures thereof.

Peroxide polymerization agents useful in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethylhexanoate), 2,5-dimethyl-2,5-di(benzoylperoxy)-hexane, benzoyl peroxide, 2,5-dimethyl 2,5-(t-butyl peroxy)-hexane, 1,1-ditert-butyl peroxy-3,3,5-trimethyl cyclohexane, 4,4-ditert-butyl peroxy n-butyl valerate, preferably dicumyl peroxide at a concentration of about 40%. The above polymerization agents are commercially available.

Co-agents which can be used with the above peroxide polymerization agents include zinc diacrylate, zinc dimethacrylate, trimethlol propane triacrylate, and trimethloyl propane trimethacrylate, preferably zinc diacrylate. Other co-agents which may be employed include vinyl, allyl, methallyl, furfuryl, crotyl and cinnamyl esters of the following acids: oxatic, maionic, succinic, glutaric, adipic, pimelic, suberic, azelaic, sebacic, maleic, itaconic, citraconic, mesaconic, fumaric, aconitic, phthalic, isophthalic, terephthalic, naphthalene, dicarboxylic, mellitic, pyromellitic, trimesic, acrylic, methacrylic, cennamic, and crotonic. Polyamine amides and imides of the following acids: maleic, itaconic, acrylic, methacrylic crotonic, citaconic, aconitic and cinnamic; polyol esters and anhydrides of acrylic, methacrylic, crotonic and cinnamic acids also may be used as co-agents. Other co-agents which may be employed include di- and triallyl cyanurate; di- and triallylmelamine, divinyl benzene; diallyl benzene; diallyl amine; allyl ether; allyl gycolates; di-, tri and tetravinyl and allyl silanes. All of these co-agents are commercially available.

Unsaturated polycarboxylic acids which may be employed in the compositions of the invention include maleic acid, fumaric acid, itaconic acid and the like, preferably fumaric acid. Use of fumaric acid in compositions including polybutadiene and epoxy resins is shown in U.S. Pat. No. 3,671,477.

In addition to the foregoing, filler materials can be employed in the compositions of the invention to control the weight of the ball without affecting ball resilience. Fillers which are incorporated into the compositions should be in finely divided form, typically in a size generally less than about 20 mesh, preferably less than about 100 mesh U.S. standard size. Preferably, the filler is a precipitated hydrated silica such as that sold under the trademark HiSil by the Pittsburgh Plate Glass Company. Other fillers which may be employed include, for example, silica, clay, talc, mica, asbestos, glass, glass fibers, Barytes(barium sulfate), limestone, Lithopone(zinc sulphide-barium sulfate), titanium dioxide, zinc sulphide, calcium metasilicate, silicon carbide, diatomaceous earth, particulate carbonaceous materials, micro balloons, aramid fibers, particulate synthetic plastics such as high molecular weight polyethylene, polystyrene, polyethylene, ionomer resins and the like, as well as cotton flock, cellulose flock and leather fiber. Powdered metals such as titanium, tungsten, aluminum, bismuth, nickel, molybdenum, copper, brass and their alloys also may be used as fillers. The amount of filler employed is primarily a function of weight restrictions on the weight of a golf ball made from those compositions.

The compositions of the invention also may include various processing aids known in the rubber and molding arts such as fatty acids. Generally, free fatty acids having from about 10 carbon atoms to about 40 carbon atoms, preferably having from about 15 carbon atoms to about 20 carbon atoms, may be used. Fatty acids which may be used include stearic acid and linoleic acids, as well as mixtures thereof. When included in the compositions of the invention, the fatty acid component is present in amounts of from about 1 part by weight per 100 parts elastomer to about 15 parts by weight per 100 parts elastomer, preferably in amounts of from about 2 parts by weight per 100 parts elastomer to about 5 parts by weight per 100 parts elastomer. Examples of processing aids which may be employed include, for example, calcium stearate, barium stearate, zinc stearate, lead stearate, basic lead sulfite, dibasic lead phosphite, dibutyltin dilaurate, dibutyltin dimaleate, dibutyltin mercaptide, as well as dioctyltin and stannane diol derivatives.

Coloring pigments also may be included in the compositions of the invention. Useful coloring pigments include, for example, titanium dioxide, the presence of which simplifies the surface painting operation of the finished ball. In some cases, coloring pigments eliminate the need for painting, such as, for example, where the ball is intended for use on driving ranges.

The compositions of the invention typically include, based on the total weight of the composition, about 100 parts by weight of cis 1,4 polybutadiene to about 175 parts by weight of cis 1,4 polybutadiene, preferably about 100 parts by weight of cis 1,4 polybutadiene, zinc diacrylate in an amount of up to about 40 parts by weight, preferably from about 5 parts by weight of zinc diacrylate to about 30 parts by weight of zinc diacrylate, about 4 parts by weight of dicumyl peroxide at 40% concentration to about 7 parts by weight of dicumyl peroxide at 40% concentration, preferably about 4 parts by weight of dicumyl peroxide at 40% concentration to about 5 parts by weight of dicumyl peroxide at 40% concentration, and about 20 parts by weight fumaric acid to about 50 parts by weight fumaric acid, preferably about 20 parts by weight fumaric acid to about 40 parts by weight fumaric acid.

The amount of filler which can be employed in the compositions is primarily a function of restrictions on the weight of a golf ball formed from the compositions. The filler is included in amounts of from about 5 parts by weight per 100 parts elastomer to about 100 parts by weight per 100 parts elastomer. Processing aids such as fatty acids, metal stearates and the like may be employed in amounts of from about 1 part by weight per 100 parts elastomer to about 15 parts by weight per 100 parts elastomer, preferably in amounts of from about 2 parts by weight per 100 parts elastomer to about 5 parts by weight per 100 parts elastomer.

Wide latitude may be taken in the production of balls from the compositions of the invention to provide balls of various compressions suitable for every type of golfer. Low compression balls, generally preferred by the "soft" hitters or lady golfers, may be made by increasing the proportion of the elastomer component in the composition. Medium compression balls, preferred by the average golfers, may be made by balancing the amounts of the elastomer, co-agent, peroxide polymerization agent, and fumaric acid. High compression balls preferred by the "hard" hitters may be made by increasing the proportions of unsaturated polycarboxylic acid, co-agent, and peroxide polymerization agent initiator.

In producing one-piece golf balls from the present compositions, the components of the compositions are intimately mixed, using, for example, two roll mills or a Banbury mixer until the mixture is uniform, usually over a period of from about 5 to about 20 minutes. The sequence of addition of components is not critical.

A preferred mixing sequence is one wherein cis-1,4 polybutadiene, zinc diacrylate, filler and fumaric acid are blended for about 5 minutes in a Banbury mixer. The peroxide polymerization agent is then added and the mixing continued for about one minute. The mixed batch then is discharged onto a two roll mill, mixed for about one additional minute and formed into a sheet. The temperature of the mixing is not critical, but should, of course, be below the curing temperature. Mixing is generally done at room temperature, although, through friction, the ingredients may be slightly warmed.

A golf ball formed from compositions of the invention may be made by conventional mixing and compounding procedures used in the rubber industry. Typically, a golf ball is produced by placing uncured, preformed portions or slugs of the compositions of the invention between two halves of a conventional press mold that has dimpled golf ball cavities therein. Thereafter, pressure is applied to close the two halves of the mold during the curing process. The volume of the preformed portions placed in the mold cavities is slightly in excess of the actual volume of the ball cavities to enable the cavities to be completely filled when the mold is closed. Thus, an extrudate or flash of excess composition typically is formed at the mating surfaces of the closed cavities.

The compositions of the invention can be formed into one-piece golf balls by any one of a variety of known molding techniques, e.g. injection molding, compression molding or transfer molding. Typically the molded balls are cured by heating at about 275° F. to about 350° F. under a pressure of about 100 PSI–500 PSI, preferably about 500 PSI per ball. The time required for curing is normally about 10 minutes to about 20 minutes depending upon the amount and activity of the selected peroxide polymerization agent and co-agent. Preferably, curing of the compositions is between about 300° F. and about 340° F. for about 10 minutes to about 30 minutes, more preferably, about 320° F. for about 20 minutes.

After curing, the resulting balls are cooled for about 10 minutes in the mold by circulating cold water through the mold. The molded balls, with dimples, are trimmed to remove the flash line and the ball surface is treated to facilitate good paint adhesion. Surface treatment of the dimpled ball can be performed by several techniques known in the art, such as corona discharge, ozone treatment, chlorination, sand blasting, etc. the ball is then given one coat of paint, stamped and clear coated.

If a two-piece ball is desired, the core is surface treated to facilitate adhesion to covering compositions. Surface treatment of the core can be performed by several techniques known in the art, such as corona discharge, ozone treatment, sand blasting, brush tumbling, and the like. Preferably, surface treatment is effected by grinding with an abrasive wheel. A cover then can be applied in accordance with known procedures. Useful cover compositions include blends of ethylene-acrylic acid or ethylene-methacrylic acid, as well as copolymers neutralized with mono- or divalent metals such as sodium, potassium, lithium, calcium, zinc or magnesium. Such compositions are disclosed in U.S. Pat. No. 5,368,304, the disclosure of which is incorporated herein by the entirety by reference.

Examples 1–22 shown in Table I show one-piece golf balls prepared from various compositions, molding pressures and curing conditions to yield one-piece golf balls of from about 60 PGA compression to about 100 PGA compression. The balls produced in accordance with the invention have increased durability and flexibility. These characteristics make them especially suited for use as range balls. For example, balls such as those formed from examples 8, 9, 14–16, 21 and 22 which do not employ ZnO and which are subjected to the "Guillotine Cut Test" pass that test.

Example 23 shown in Table II shows the negative effect of adding ZnO as the ball has a PGA compression of only 2. The same formulation without ZnO shown as example 1 in Table I has a PGA compression of 65–70 and is very durable.

| COMPONENT/EXAMPLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| ZN MALEATE 230XL[1] | | | | | | | | | | | | | | | | | | 10 | | | | |
| CARIFLEX | | 3 | 3 | 3 | 3 | 3 | | | | | | | | | | | | | 2 | | | |
| BR-1220[2] | 100 | | | | 40 | 60 | 100 | 100 | 125 | 175 | 175 | 100 | 100 | 125 | 100 | 100 | 100 | 100 | 100 | 100 | 125 | 125 |
| DiCup 40°C.[3] | 4 | | | | | | 4 | 4 | 4 | 5 | 7 | 7 | 4 | 4 | 4 | 4 | 4 | 4 | 4 | 4 | 5 | 5 |
| FUMARIC ACID | 50 | | | | | | 30 | 30 | 50 | 50 | 50 | 50 | 28 | 50 | 50 | 40 | 20 | 50 | 20 | 50 | 50 | 50 |
| HISIL 532EP[4] | | 50 | 50 | | 20 | | | | | | | | | | | | | | | | | |
| HISIL 233[5] | | | | 50 | | 20 | | | | | | | | | | | | | 15 | | | |
| LIMESTONE | | | | | | | | | | | | | 20 | | | | | | | | | |
| SR351[6] | | 100 | 100 | 100 | | | | | | | | | | | | 5 | 25 | | | | | |
| VCR412[7] | | 10 | 10 | 10 | | | | | 10 | 10 | 30 | 30 | 3 | 5 | | 2 | 10 | 4 | 7.5 | 5 | 5 | 5 |
| ZDA | 10 | | | | 5 | 5 | 20 | 20 | | | 10 | 10 | 5 | 10 | 10 | | | | | 5 | 5 | 5 |
| ZN STEARATE | | | | | | | | 20 | | | | 10 | | | | | | | | | | |
| MOLD TEMP. F. | 320 | 310 | 310 | 310 | 310 | 310 | 320 | 320 | 320 | 320 | 320 | 320 | 320 | 320 | 320 | 320 | 320 | 320 | 320 | 320 | 320 | 320 |
| WEIGHT (g) | 44.6 | 48.9 | 50.1 | 49.9 | 46.5 | 46.5 | 45 | 45 | 45.3 | 45.5 | 46.2 | 46.9 | 46.3 | 46.1 | 44.5 | 44.9 | 45.8 | 46.5 | 44.5 | 45.4 | 44.4 | 45.2 |
| COMPRESS.[8] | 65–70 | 85–90 | 95–100 | 85–90 | 115 | 70 | 60 | 55 | 115 | 105 | 85 | 80–85 | 60 | 100 | 75 | 62 | 75 | 85–90 | 85 | 100–105 | 82 | 82 |
| TO REGRIND[9] | 15 | | | | | | | | | | | | | | | | | | | | | |
| ZNO | 5 | | | 5 | | | | | | | | | | | | | | | | | | |
| DEG[10] | | | 5 | | | | | | | | | | | | | | | | | | | |
| AMERIPOL 1904[11] | | | | | 60 | 60 | | | | | | | | | | | | | | | | |

[1] α-butyl-4,4-bis(t-butyl peroxy) valerate from R. T. Vanderbilt, Co.
[2] cis1,4 polybutadiene from Shell Chemical Co.
[3] dicumyl peroxide, 40% concentration from Hercules Chemical Co.
[4] compressed silica powder from PPG Co.
[5] Silica powder from PPG Co.
[6] Trimethylolpropane triacrylate from Sartomer Resin Co.
[7] Polybutadiene from UbePol Co., Japan
[8] PGA compression
[9] Top Grade Regrind: A cured composition having about 55% cis1,4 polybutadiene, about 10% ZNO, about 10.9% zinc stearate, about 16% zinc diacrylate, about 2.6% limestone, about 0.5% 1-di(t-butyl peroxy)3,3,5-trimethyl cyclo hexane, and about 5% additonal regrind formed of the foregoing. All percentages based on the weight of the regrind composition; 20 mesh size.
[10] Diethylene glycol
[11] Styrene-butadiene from Synpol Co., Akron, OH

TABLE II

| Example 23/Component | Value |
| --- | --- |
| Cariflex Br-1220[1] | 100 parts by wt. |
| DiCup 40C[2] | 4 parts by wt. |
| Fumaric Acid | 50 parts by wt. |
| ZDA[3] | 10 parts by wt. |
| ZnO | 5 parts by wt. |
| Mold Temp. | 320° F. |
| Cure Time | 20 minutes |
| Weight | 46.4 gm |
| Compression | 2 PGA |

[1]. cis 1,4 polybutadiene from Shell Chemical Co.
[2]. Dicumyl peroxide, 40% concentration from Hercules Chemical Co.
[3]. Zinc diacrylate The "Guillotine Cut Test" is performed by holding the ball firmly in a cavity to expose the top half of the ball. A guillotine blade weighing 5 pounds and having inner and outer blade edge angles of 90° and 60°, respectively, and a cutting edge of three sixty fourths inch radius is dropped from a height of 3.5 feet to strike the ball at one half inch off the top center point. The guillotine blade is guided during the drop by means of a substantially friction-free vertical track. Ball failure is defined as permanent damage evidenced by a crack or by removal of a segment from the ball surface.

The present invention relates most particularly to the use of a novel composition of matter in a golf ball. Other extensive applications, however, may also be mentioned. These include, for example, the manufacture of printing plates, coverings for rolls or the manufacture of rolls per se, protective bumpers, bowling balls, insulators, floor tiles, shoe soles and heels, battery boxes, solid tired and the like. Other applications are possible for the compositions of the invention where properties of resilience, toughness and high impact resistance are required.

While certain representative embodiments and details of the present invention have been shown for the purposes of illustrating the invention, it will be apparent to those skilled in the art that various changes and modifications may be made therein without departing from the spirit or scope of the invention.

What is claimed is:

1. A composition comprising a cured blend of an elastomer capable of being crosslinked by peroxide-initiated polymerization, a peroxide polymerization agent, a co-agent, and and an unsaturated polycarboxylic acid wherein said composition is substantially free of zinc oxide, and wherein said co-agent is selected from the group consisting of zinc diacrylate, zinc dimethacrylate, trimethlol propane triacrylate, and trimethloyl propane trimethacrylate.

2. The composition of claim 1 wherein said unsaturated polycarboxylic acid is present in an amount of about 20 parts by weight to about 50 parts by weight based on 100 parts of said elastomer.

3. The composition of claim 1 wherein said elastomer is selected from the group consisting of cis 1,4-polybutadiene, polyisoprene, ethylene/propylene/non-conjugated diolefin terpolymers, styrene/butadiene rubber, natural rubber, ethylene propylene rubber, and mixtures thereof.

4. The composition of claim 2 wherein said unsaturated polycarboxylic acid is selected from the group consisting of citraconic acid, itaconic acid, fumaric acid, maleic acid, and mixtures thereof.

5. The composition of claim 4 wherein said peroxide polymerization agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di (benzoylperoxy)-hexane, benzoyl peroxide, 2,5-dimethyl-2, 5-(t-butylperoxy)-hexane, 1,1-ditert-butylperoxy-3,3,5-trimethyl cyclohexane, 4,4-ditert-butyl peroxy n-butyl valerate.

6. The composition of claim 1 wherein said co-agent is zinc diacrylate, said peroxide polymerization agent is dicumyl peroxide, said unsaturated polycarboxylic acid is fumaric acid, and said elastomer is cis 1,4-polybutadiene.

7. The composition of claim 6 wherein said zinc diacrylate is present in an amount of up to about 40 parts by weight, said dicumyl peroxide is present in an amount of about 4 parts by weight to about 7 parts by weight, said fumaric acid is present in an amount of about 20 parts by weight to about 50 parts by weight, and said cis 1,4-polybutadiene is present in an amount of about 100 parts by weight to about 175 parts by weight, all of the amounts based on total weight of the composition.

8. The composition of claim 7 wherein said zinc diacrylate is present in an amount of about 5 parts by weight to about 30 parts by weight, said dicumyl peroxide is present in an amount of about 4 parts by weight to about 7 parts by weight, said fumaric acid is present in an amount of about 20 parts by weight to about 40 parts by weight, and said cis 1,4-polybutadiene is present in an amount of about 100 parts by weight, all of the amounts based on total weight of the composition.

9. The composition of claim 1 further comprising a filler material selected from the group consisting of silica, clay, diatomaceous earth, talc, mica, asbestos, glass, glass fibers, Barytes, limestone, Lithopone, titanium dioxide, zinc sulphide, calcium metasilicate, silicon carbide, high molecular weight polyethylene, polystyrene, polyethylene, cotton flock, cellulose flock leather fiber, titanium, tungsten, aluminum, bismuth, nickel, molybdenum, copper, brass and alloys.

10. The composition of claim 1 wherein a filler material selected from the group consisting of particulate carbonaceous material, micro balloons, aramid fibers and ionomer resins is present in said composition.

11. The composition of claim 10 wherein said filler is selected from the group consisting of particulate carbonaceous material, micro balloons, aramid fibers and ionomer resins.

12. A golf ball comprising a cured blend of an elastomer capable of being crosslinked by peroxide-initiated polymerization, a peroxide polymerization agent, a co-agent, and an unsaturated polycarboxylic acid wherein said composition is substantially free of zinc oxide, and wherein said co-agent is selected from the group consisting of zinc diacrylate, zinc dimethacrylate, trimethlol propane triacrylate, and trimethloyl propane trimethacrylate.

13. The golf ball of claim 12 wherein said acid is present in an amount of about 20 parts by weight to about 50 parts by weight based on 100 parts of said elastomer.

14. The golf ball of claim 12 wherein said elastomer is selected from the group consisting of cis 1,4-polybutadiene, polyisoprene, ethylene/propylene/non-conjugated diolefin terpolymers, styrene/butadiene rubber, natural rubber, ethylene propylene rubber, and mixtures thereof.

15. The golf ball of claim 14 wherein said unsaturated polycarboxylic acid is selected from the group of citraconic acid, itaconic acid, fumaric acid, maleic acid, and mixtures thereof.

16. The golf ball of claim 15 wherein said peroxide polymerization agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di (benzoylperoxy)-hexane, benzoyl peroxide, 2,5-dimethyl-2, 5-(t-butylperoxy)-hexane, 1,1-ditert-butylperoxy-3,3,5-trimethyl cyclohexane, 4,4-ditert-butyl peroxy n-butyl valerate.

17. The golf ball of claim 12 wherein said ball is a one-piece ball.

18. The golf ball of claim 17 wherein said co-agent is zinc diacrylate, said peroxide polymerization agent is dicumyl peroxide, said carboxylic acid is fumaric acid, and said elastomer is cis 1,4-polybutadiene.

19. The golf ball of claim 18 wherein said zinc diacrylate is present in an amount of up to about 40 parts by weight, said dicumyl peroxide is present in an amount of up to about 10 parts by weight, said fumaric acid is present in an amount of about 20 parts by weight to about 50 parts by weight, and said cis 1,4-polybutadiene is present in an amount of about 100 parts by weight to about 175 parts by weight, all of the amounts based on total weight of the composition.

20. The golf ball of claim 18 wherein said zinc diacrylate is present in an amount of about 5 parts by weight to 30 parts by weight, said dicumyl peroxide is present in an amount of about 4 parts by weight to about 7 parts by weight, said fumaric acid is present in an amount of about 20 parts by weight to about 40 parts by weight, and said cis 1,4-polybutadiene is present in an amount of about 100 parts by weight all of the amounts based on total weight of the composition.

21. The golf ball of claim 12 wherein said blend includes a filler material selected from the group consisting of silica, clay, talc, mica, asbestos, glass, glass fibers, Barytes, limestone, Lithopone, titanium dioxide, zinc sulphide, calcium metasilicate, silicon carbide, diatomaceous earth, high molecular weight polyethylene, polystyrene, polyethylene, cotton flock, cellulose flock leather fiber, titanium, tungsten, aluminum, bismuth, nickel, molybdenum, copper, brass and alloys.

22. The golf ball of claim 12 wherein said blend includes a filler material selected from the group consisting of particulate carbonaceous materials, micro balloons, aramid fibers, and ionomer resins.

23. The golf ball of claim 12 wherein said elastomer is synthetic natural rubber.

24. A composition comprising an elastomer capable of being crosslinked by peroxide-initiated polymerization, a peroxide polymerization agent, a co-agent, and an unsaturated polycarboxylic acid, wherein said blend is substantially free of ZnO, and wherein said peroxide polymerization agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, 1,1-ditert-butylperoxy-3,3,5-trimethylcyclohexane, 4,4-ditert-butylperoxy-butyl valerate, and wherein said co-agent is zinc diacrylate, said peroxide polymerization agent is dicumyl peroxide, said unsaturated polycarboxylic acid is fumaric acid, and said elastomer is cis 1,4-polybutadiene.

25. The composition of claim 24 wherein said zinc diacrylate is present in an amount of up to about 40 parts by weight, said dicumyl peroxide is present in an amount of about 4 parts by weight to about 7 parts by weight, said fumaric acid is present in an amount of about 20 parts by weight to about 50 parts by weight, and said cis 1,4-polybutadiene is present in an amount of about 100 parts by weight to about 175 parts by weight, all of the amounts based on total weight of the composition.

26. The composition of claim 24 wherein said co-agent is selected from the group consisting of zinc diacrylate, zinc dimethacrylate, trimethlol propane triacrylate, and trimethloyl propane trimethacrylate.

27. A golf ball comprising a cured blend of an elastomer capable of being crosslinked by peroxide-initiated polymerization, a peroxide polymerization agent, a co-agent, and an unsaturated polycarboxylic acid, wherein said blend is substantially free of ZnO, and wherein said peroxide polymerization agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, 1,1-ditert-butylperoxy-3,3,5-trimethylcyclohexane, 4,4-ditert-butylperoxy-butyl valerate, and wherein said co-agent is zinc diacrylate, said peroxide polymerization agent is dicumyl peroxide, said usaturated polycarboxylic acid is fumaric acid, and said elastomer is cis 1,4-polybutadiene.

28. The golf ball of claim 27 wherein said zinc diacrylate is present in an amount of up to about 40 parts by weight, said dicumyl peroxide is present in an amount of about 4 parts by weight to about 7 parts by weight, said fumaric acid is present in an amount of about 20 parts by weight to about 50 parts by weight, and said cis 1,4-polybutadiene is present in an amount of about 100 parts by weight to about 175 parts by weight, all of the amounts based on total weight of the composition.

29. The golf ball of claim 27 wherein said co-agent is selected from the group consisting of zinc diacrylate, zinc dimethacrylate, trimethlol propane triacrylate, and trimethloyl propane trimethacrylate.

30. The golf ball of claim 27 wherein said ball is a one-piece ball.

\* \* \* \* \*